United States Patent
Di Nicola et al.

(10) Patent No.: US 10,547,441 B2
(45) Date of Patent: Jan. 28, 2020

(54) METHOD AND APPARATUS FOR RESTORING ACCESS TO DIGITAL ASSETS

(71) Applicant: Conio Inc., San Francisco, CA (US)

(72) Inventors: Vincenzo Di Nicola, Kirkland, WA (US); Guido Dassori, Teramo (IT)

(73) Assignee: Conio Inc., San Francisco, CA (US)

( * ) Notice: Subject to any disclaimer, the term of this patent is extended or adjusted under 35 U.S.C. 154(b) by 196 days.

(21) Appl. No.: 15/690,130

(22) Filed: Aug. 29, 2017

(65) Prior Publication Data

US 2018/0069697 A1    Mar. 8, 2018

Related U.S. Application Data

(60) Provisional application No. 62/383,018, filed on Sep. 2, 2016.

(51) Int. Cl.
   *H04L 9/08* (2006.01)
   *H04L 9/32* (2006.01)
   *H04L 29/06* (2006.01)

(52) U.S. Cl.
   CPC .............. *H04L 9/08* (2013.01); *H04L 9/3213* (2013.01); *H04L 63/0823* (2013.01); *H04L 2209/56* (2013.01)

(58) Field of Classification Search
   CPC ........................................................ H04L 9/08
   See application file for complete search history.

(56) References Cited

U.S. PATENT DOCUMENTS

| | | | |
|---|---|---|---|
| 5,265,164 A * | 11/1993 | Matyas | G06F 9/30003 380/2 |
| 5,485,519 A * | 1/1996 | Weiss | G06F 21/31 235/379 |
| 5,835,592 A | 11/1998 | Chang et al. | |
| 2004/0236694 A1 | 11/2004 | Tattan et al. | |

(Continued)

FOREIGN PATENT DOCUMENTS

| | | |
|---|---|---|
| EP | 3507701 A1 | 7/2019 |
| WO | WO2016077121 A1 | 5/2016 |

(Continued)

OTHER PUBLICATIONS

"International Search Report" and "Written Opinion of the International Searching Authority," Patent Cooperation Treaty App. No. PCT/US2017/049209, dated Nov. 20, 2017, 11 pages.

(Continued)

*Primary Examiner* — Simon P Kanaan
(74) *Attorney, Agent, or Firm* — Carr & Ferrell LLP

(57) ABSTRACT

A method and apparatus may include receiving a request to restore access to digital assets of a digital wallet. The digital assets are accessed via M-number of cryptographic keys. Access to at least N-out-of-M keys is necessary in order to access the digital assets at a given time. N is a number less than M. The M-number of keys include at least a first key, a second key, and a third key. One of the M keys is stored on a first server. One of the M keys is stored on a second server. The key stored on the first server corresponds to the second key. The key stored on the second server corresponds to the third key. The second server is separated from the first server. With certain embodiments, the second server is totally disconnected from any network.

17 Claims, 9 Drawing Sheets

(56) References Cited

U.S. PATENT DOCUMENTS

| | | |
|---|---|---|
| 2006/0106754 A1 | 5/2006 | Blumenau et al. |
| 2007/0014399 A1 | 1/2007 | Scheidt et al. |
| 2008/0075288 A1 | 3/2008 | Kamijoh et al. |
| 2008/0162935 A1 | 7/2008 | Ginzboorg et al. |
| 2009/0144557 A1* | 6/2009 | Sutton ............... H04L 9/088 713/189 |
| 2010/0088521 A1* | 4/2010 | Koplow ............. G06F 21/645 713/178 |
| 2010/0111308 A1 | 5/2010 | Forsberg et al. |
| 2013/0124870 A1 | 5/2013 | Rosati et al. |
| 2013/0159732 A1 | 6/2013 | Leoutsarakos |
| 2013/0198519 A1 | 8/2013 | Marien et al. |
| 2015/0170112 A1 | 6/2015 | Decastro |
| 2015/0262171 A1 | 9/2015 | Langschaedel et al. |
| 2015/0348017 A1 | 12/2015 | Allmen |
| 2016/0127336 A1 | 5/2016 | Cignetti et al. |
| 2018/0367316 A1 | 12/2018 | Cheng et al. |
| 2019/0354972 A1 | 11/2019 | Di Nicola |

FOREIGN PATENT DOCUMENTS

| | | |
|---|---|---|
| WO | WO2017145016 A1 | 8/2017 |
| WO | WO2018044946 A1 | 3/2018 |
| WO | WO2019221956A1 A1 | 11/2019 |

OTHER PUBLICATIONS

Dwyer, Gerald P., "The Economics of Bitcoin and Similar Private Digital Currencies," 2014 [retrieved on Oct. 19, 2017], Retrieved from the Internet: <URL:http://mpra.ub.unii-muenchen.de/57360/3/MPRA_paper_57360.pdf>, 31 pages.

"International Search Report" and "Written Opinion of the International Searching Authority," Patent Cooperation Treaty App. No. PCT/US2019/030900, dated Jul. 17, 2019, 7 pages.

* cited by examiner

METHOD AND APPARATUS FOR RESTORING ACCESS TO DIGITAL ASSETS

CROSS REFERENCE TO RELATED APPLICATION

This U.S. Non-Provisional Patent Application claims the priority benefit of U.S. Provisional Patent Application Ser. No. 62/383,018 filed on Sep. 2, 2016 and titled "Method and Apparatus for Restoring Access to Digital Assets," the entirety of which is incorporated herein by reference.

FIELD OF THE INVENTION

Certain embodiments of the present invention relate to restoring access to digital assets.

BACKGROUND

Digital assets can generally refer to anything that is manifested in a binary format and that has a corresponding right to use. One example of a digital asset is a digital currency, and one type of digital currency is cryptocurrency. Digital currencies can utilize a centralized control system or a decentralized control system. Cryptocurrencies generally utilize a decentralized control system.

SUMMARY

According to a first embodiment, a method can include receiving a request to restore access to digital assets of a digital wallet. The digital assets are accessed via M-number of cryptographic keys. Access to at least N-out-of-M keys is necessary in order to access the digital assets at a given time. N is a number less than M. The M-number of keys include at least a first key, a second key, and a third key. One of the M keys is stored on a first server. One of the M keys is stored on a second server. The key stored on the first server corresponds to the second key. The key stored on the second server corresponds to the third key. The second server is separated from the first server. The method can also include generating a first visual representation of the request to restore access to digital assets. The method can also include presenting the first visual representation to the second server. The third cryptographic key signs the first visual representation if the first visual representation meets conditions of the third cryptographic key for accessing the digital assets. The method can also include retrieving a second visual representation from the second server. The second visual representation is generated when the first visual representation meets the conditions of the third cryptographic key. The method can also include determining whether the second visual representation meets conditions of the second cryptographic key for accessing the digital assets. The second cryptographic key signs the second visual representation if the second visual representation meets the conditions of the second cryptographic key for accessing the digital assets. The method also includes generating an indication that the request is cryptographically approved. The indication is generated when the second visual representation meets the conditions of the second cryptographic key. The method also includes restoring access to the digital assets of the digital wallet via the indication.

In the method of the first embodiment, the first cryptographic key has been lost.

In the method of the first embodiment, the first server is network-separated from the second server, and the second server is totally disconnected from any network.

In the method of the first embodiment, the first visual representation may be presented as a Quick Response code.

According to a second embodiment, an apparatus can include at least one processor. The apparatus can also include at least one memory including computer program code. The at least one memory and the computer program code can be configured, with the at least one processor, to cause the apparatus at least to receive a request to restore access to digital assets of a digital wallet. The digital assets are accessed via M-number of cryptographic keys. Access to at least N-out-of-M keys is necessary in order to access the digital assets at a given time. N is a number less than M. The M-number of keys include at least a first key, a second key, and a third key. One of the M keys is stored on the apparatus; one of the M keys is stored on a server. The key stored on the apparatus corresponds to the second key. The key stored on the server corresponds to the third key. The server is separated from the apparatus. The apparatus can also be caused to generate a first visual representation of the request to restore access to digital assets. The apparatus can also be caused to present the first visual representation to the server. The third cryptographic key signs the first visual representation if the first visual representation meets conditions of the third cryptographic key for accessing the digital assets. The apparatus can also be caused to retrieve a second visual representation from the server. The second visual representation is generated when the first visual representation meets the conditions of the third cryptographic key. The apparatus can also be caused to determine whether the second visual representation meets conditions of the second cryptographic key for accessing the digital assets. The second cryptographic key signs the second visual representation if the second visual representation meets the conditions of the second cryptographic key for accessing the digital assets. The apparatus can also be caused to generate an indication that the request is cryptographically approved. The indication is generated when the second visual representation meets the conditions of the second cryptographic key. The apparatus can also be caused to restore access to the digital assets of the digital wallet via the indication.

In the apparatus of the second embodiment, the first cryptographic key has been lost.

In the apparatus of the second embodiment, the apparatus is network-separated from the server, and the server is totally disconnected from any network.

In the apparatus of the second embodiment, the first visual representation may be presented as a Quick Response code.

According to a third embodiment, a computer program product can be embodied on a non-transitory computer readable medium. The computer program product can be configured to control a processor to perform a method according to the first embodiment.

According to a fourth embodiment, a method can include receiving, by a second server, a first visual representation from a first server. The first visual representation corresponds to a request to restore access to digital assets. The digital assets are accessed via M-number of cryptographic keys. Access to at least N-out-of-M keys is necessary in order to access the digital assets at a given time. N is a number less than M. The M-number of keys include at least a first key, a second key, and a third key. One of the M keys is stored on the first server. One of the M keys is stored on the second server. The key stored on the first server corresponds to the second key. The key stored on the second server corresponds to the third key. The second server is separated from the first server. The second server is totally disconnected from any network. The method can also include determining whether the first visual representation meets conditions of the third cryptographic key for accessing the digital assets. The third cryptographic key signs the first visual representation if the first visual representation meets the conditions of the third cryptographic key for accessing the digital assets. The method also includes generating a second visual representation. The second visual representation is generated when the first visual representation meets the conditions of the third cryptographic key.

According to a fifth embodiment, an apparatus includes at least one processor. The apparatus also includes at least one memory including computer program code. The at least one memory and the computer program code can be configured, with the at least one processor, to cause the apparatus at least to receive a first visual representation from a server. The first visual representation corresponds to a request to restore access to digital assets. The digital assets are accessed via M-number of cryptographic keys. Access to at least N-out-of-M keys is necessary in order to access the digital assets at a given time. N is a number less than M. The M-number of keys include at least a first key, second key, and a third key. One of the M keys is stored on the server. One of the M keys is stored on the apparatus. The key stored on the server corresponds to the second key. The key stored on the apparatus corresponds to the third key. The apparatus is separated from the server. The apparatus is totally disconnected from any network. The apparatus can also be caused to determine whether the first visual representation meets the conditions of the third cryptographic key for accessing the digital assets. The third cryptographic key signs the first visual representation if the first visual representation meets conditions of the third cryptographic key for accessing the digital assets. The apparatus can also be caused to generate a second visual representation. The second visual representation is generated when the first visual representation meets the conditions of the third cryptographic key.

According to a sixth embodiment, a computer program product can be embodied on a non-transitory computer readable medium. The computer program product can be configured to control a processor to perform a method according to the fourth embodiment.

BRIEF DESCRIPTION OF THE DRAWINGS

For proper understanding of the invention, reference should be made to the accompanying drawings, wherein.

DETAILED DESCRIPTION

Figure 1:
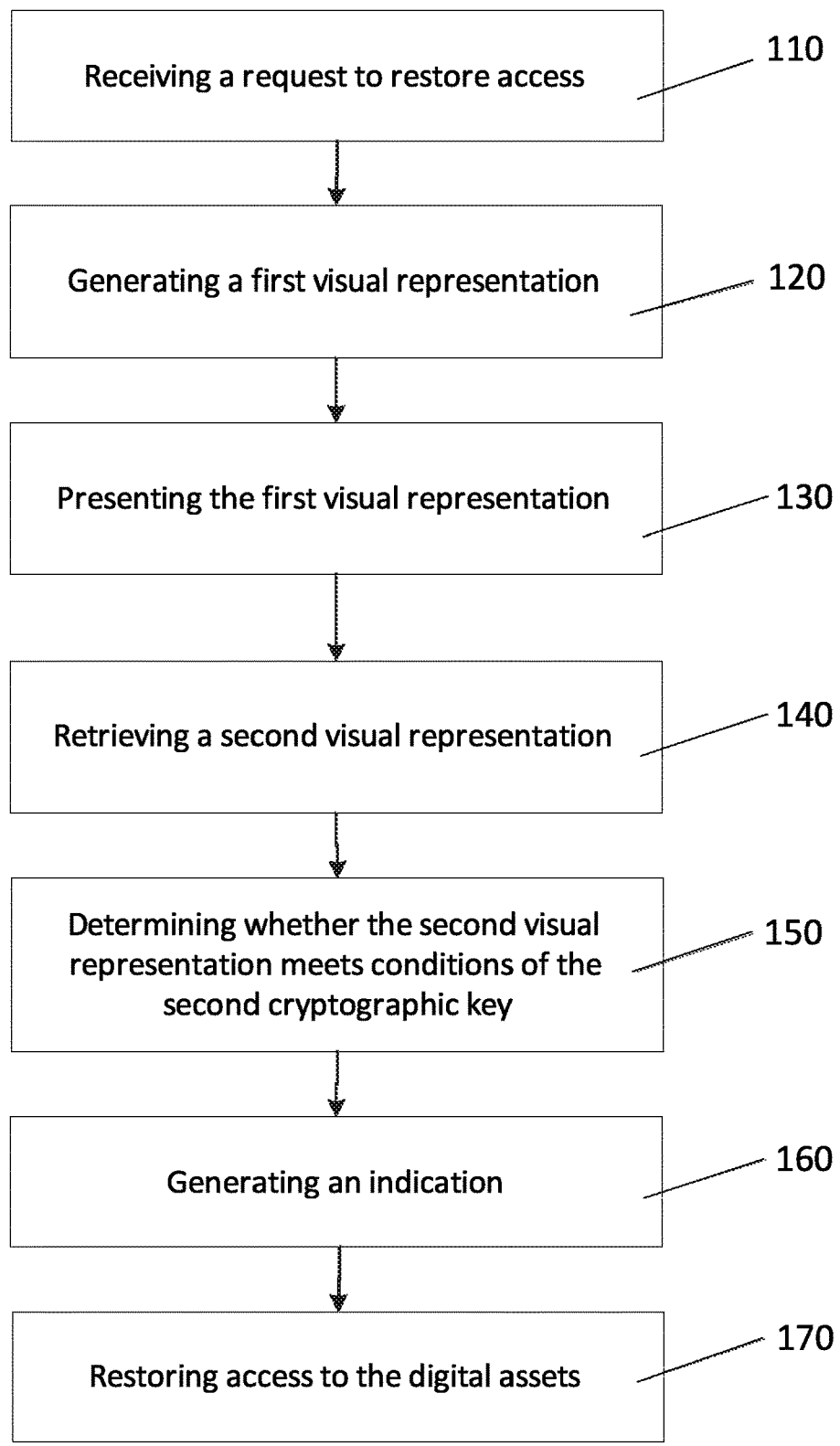
FIG. 1 illustrates a flowchart of a method in accordance with certain embodiments of the invention.

In the field of cryptography, a key may generally refer to information that determines an output of a cryptographic algorithm/process. For example, a key may provide a user with access to cryptographically-secured information. In one example use case, the user may have a digital wallet containing assets, and the user may use a key as a digital credential to enable operations with digital assets in a digital wallet. The user may also use the key to access information relating to the digital wallet, for example. A digital wallet may generally refer to a software or hardware device that enables a digital asset holder to electronically complete commercial transactions with the digital assets.

With certain embodiments, a digital key can be in the form of an alphanumeric string of characters or bits that allows access to the digital wallet. In one embodiment, the digital key may include a 256-bit string or a 512-bit string, for example.

When a user turns on a device of the digital wallet (such as a phone and/or a computer), the device uses the digital key to have full operational control of the digital assets of the digital wallet. With the previous approaches of managing digital assets and confidential information (such as financial information, for example), a first key may be stored on the user's device. For example, the first key may be stored on the user's smartphone or computer. The user uses this first key to enable operations with the user's digital assets and to access the financial information relating to the digital wallet.

In a more complex scenario, the digital wallet can also be fully accessed through a multi-key approach. When the user initially creates a digital wallet, the first key is generated and stored on the user's device. In addition, upon creation of the first key, the user initiates a web request to a first server (owned, for example, by a service providing company, referred to as the "company"). The first server generates and stores a second key. When both the first key and the second key are presented as credentials to access digital assets, the user has full operational control of the digital assets. In other words, the user can access digital assets/financial information after: (1) the user presents the first key, and (2) the company's first server presents the second key.

Finally, with the previous approaches, the company also generally creates and stores a third key within another server (a second server) of the company. This second server is generally controlled by the company, and the second server is generally accessible by the company. For example, with the previous approaches, the second server is generally network-connected to the company server.

In the event that the user loses control of the first key (such as by losing the user's phone, for example), the company can use the second key in conjunction with the third key to regenerate/gain access to the user's digital assets and financial data. Thus, as described above, with two of the three keys (i.e., the second key and the third key), the company can access the user's digital assets, and can gain access to the user's digital wallet.

However, because the company server is generally network-connected with the second server (in the previous approaches), a network intruder who is able to gain unauthorized access to the company's servers may be able to access the second key (on the company's first server) and may also be able to gain access to the third key (on the second server). Thus, if the intruder/hacker is able to gain unauthorized access to the company's servers, the intruder/hacker may readily access both the second key and the third key. Upon gaining access to two keys, the intruder/hacker may gain unauthorized full operational access to the user's financial information and digital assets.

In contrast to the previous approaches, certain embodiments of the present invention may be directed a system where a company first server is not network-connected to a second server, and where the second server is also not connected to the internet, as described in more detail below. The second server can also not be readily accessible by the company, or not even under control of the company. By configuring a separation between the company first server and the second server, an intruder that gains unauthorized access to the company first server can still be prevented from gaining access to the second server, thus not being able to access users' financial information and digital assets.

With certain embodiments, the second server may be able to perform digital signatures and verifications. As described above, the second server is separated from the network of the company's first server, and is also separated from the internet itself. With certain embodiments, the second server must be separated from the network of the company's first server, and must also be separated from the internet itself. The digital signatures of the second server must work together with the digital signatures of the first server in order to overcome digital assets losses. For example, as described in further detail below, the second server may scan/receive a visual representation to recover digital assets, and use mathematical algorithms to process the visual representation.

With certain embodiments of the present invention, a third key (that is stored on the second server) is synchronized with a second key (stored on the company first server), even though the second server and company first server are entirely disconnected from each other. With certain embodiments, the third key must be synchronized with the second key. Mathematical algorithms allow the second key and third key to be always in correlation at any point in time so that their combined signatures allow the recovery of the previously inaccessible digital assets.

With certain embodiments, because the second server is separated and/or network-disconnected from the company's first server, even if an intruder/hacker is able to gain unauthorized access to the second key that is stored on the company first server, the hacker is still unable to gain access to the third key that is stored on the second server. As such, with certain embodiments, with unauthorized access to only one key, the hacker is unable to gain unauthorized access to the user's financial information. As such, certain embodiments may limit the intruder/hacker to accessing only one key.

With certain embodiments, if a user loses the user's digital wallet, resulting in a loss of control/access to the first digital key, the user can contact the company that is associated with implementing the digital wallet. After the company confirms the identity of the user, the company can generate a request for accessing the third key, for the purpose of re-establishing access to the user's digital wallet. In other words, the company creates a request that is directed to the second server, in order to restore access to the digital wallet. Therefore, although the third key is stored on the second server that is network-disconnected from the company server, the company may still submit a request for accessing the third key. The company may restrict physical access to the second server that is network-disconnected from the company server. Specifically, access to the second server may be restricted to only a limited group of trusted personnel. The trusted personnel/operator may have to authenticate himself before being allowed access to the second server that is network-disconnected from the company first server. For example, the trusted operator may have to be authenticated with a smartcard that is in possession of the trusted operator, before being granted access to the second server.

Next, the company may present the request to the second server via a first visual representation of the request. For example, the first visual representation may include a first Quick Response (QR) Code that is scannable by a receiving device associated with the second server. The first QR Code can include a visual representation of an unsigned digital asset, as described in more detail below. Therefore, although the second server is network-disconnected from the company first server, the company can still access the second server and communicate with the second server, via the first visual representation. Hacking into a system that is accessed by visual representations may be very difficult for an intruder. Therefore, by using the above-described first visual representation, the company is able to access the third key, while also preventing potential hackers from accessing the third key.

Once the first visual representation is presented to the second server, certain embodiments of the present invention determine whether the first visual representation appears to be a proper request. If the first visual representation meets the conditions (i.e., it has an association with the third key) for being a proper request, then the third key on the second server is accessed, and the third key indicates approval for the request by signing the first visual representation. For example, the accessed third key can indicate approval for the request by cryptographically signing the first visual representation (which represents the request for digital assets).

With certain embodiments, after the third key has signed the first visual representation, the second server can generate a second visual representation (such as a second QR code, for example). Further, if the second visual representation meets the conditions (associated with the second key), then the second key indicates approval for the request by signing the second visual representation. Once the second key signs the second visual representation, and the third key signs the first visual representation, access to the digital assets of the digital wallet is restored. In one embodiment, the digital assets may be moved into a new wallet, in control of the user. Therefore, the third key, in conjunction with the second key, is used to digitally restore the digital wallet, as described in more detail below.

With certain embodiments of the present invention, after the third key signs a first visual representation (such as the first QR Code described above, for example), a second visual representation can be generated. Further, if the second key signs the second visual representation, certain embodiments may generate an indication that access to digital assets is to be restored.

In view of the above, certain embodiments of the present invention may enable the user to regain access to the user's digital wallet, while also protecting the third key from being easily accessed by an intruder. As such, by communicating with the second server via scannable visual representations, certain embodiments can configure the second server such that the second server cannot be easily hacked.

In view of the above, if a user of a digital wallet loses access to the digital wallet, access to the digital wallet may be restored using two of the three keys. Specifically, access to the digital wallet may be restored using the second key and the third key. With two out of three keys, certain embodiments may re-establish access to the digital wallet.

In view of the above, certain embodiments of the present invention utilize advanced, cryptographic algorithms in order to enable secure regeneration and recovery of a user's access to digital assets. Even if the user has lost the user's digital key, or has lost the user's digital wallet, the user's digital assets can still be recovered.

A method of certain embodiments is further described below. A user may create an account with a product that manages digital assets (such as a digital wallet, for example). The account may be created with a company that implements the digital wallet. After creating the account (with the company), the user receives a private key (such as a first key, as described above). The first key may comprise a 256-bit string or a 512-bit string, for example.

With certain embodiments, after the account is created, the company also creates a corresponding private key (such as a second key, as described above). This is a company key. As described above, the first key may, for example, be a 256-bit string or a 512-bit string. The second key may be a different string compared to the first key.

As described above, certain embodiments may use a second server that generates another private key (such as the third key, for example). The second server may be an offline recovery server (that may be kept in a physically-secure environment). The generated private key (i.e., the third key) can be mathematically in synchronization with the first and second keys, even if the second server is offline and removed from the Internet. With certain embodiments, the second server is always offline.

With certain embodiments, the user may be assigned a multi-signature identity (i.e., as described above, 2-out-of-3 keys are necessary to allow spending operations). Although the above examples describe that 2-out-of-3 keys are necessary to restore access to digital assets, other embodiments may not be limited to this 2-out-of-3 keys condition. For example, other embodiments may use an N-out-of-M keys condition, where N is a number less than M. For example, other embodiments may use a 5-out-of-6 keys condition.

With certain embodiments, in the event that the user loses the first key (thus preventing the user from accessing the digital assets using the multi-signature identity verification), the combination of the online production server key (the second key) and the offline recovery server key (the third key) is able to grant access via multi-signature identity verification.

In view of the above, certain embodiments of the present invention can implement multi-signature cryptography algorithms to enable digital asset recovery using a second server that is offline.

FIG. 1 illustrates a flowchart of a method in accordance with certain embodiments of the invention. The method illustrated in FIG. 1 includes, at 110, receiving a request to restore access to digital assets of a digital wallet. The digital assets are accessed via M-number of cryptographic keys. Access to at least N-out-of-M keys is necessary in order to access the digital assets at a given time. N is a number less than M. The M-number of keys include at least a first key, a second key, and a third key. One of the M keys is stored on a first server. One of the M keys is stored on a second server. The key stored on the first server corresponds to the second key. The key stored on the second server corresponds to the third key. The second server is separated from the first server. The method includes, at 120, generating a first visual representation of the request to restore access to digital assets. The method also includes, at 130, presenting the first visual representation to the second server. The third cryptographic key signs the first visual representation if the first visual representation meets conditions of the third cryptographic key for accessing the digital assets. The method also includes, at 140, retrieving a second visual representation from the second server. The second visual representation is generated when the first visual representation meets the conditions of the third cryptographic key. The method also includes, at 150, determining whether the second visual representation meets conditions of the second cryptographic key for accessing the digital assets. The second cryptographic key signs the second visual representation if the second visual representation meets the conditions of the second cryptographic key for accessing the digital assets. The method also includes, at 160, generating an indication that the request is cryptographically approved. The indication is generated when the second visual representation meets the conditions of the second cryptographic key. The method also includes, at 170, restoring access to the digital assets of the digital wallet via the indication. With certain embodiments, the third cryptographic key performs signing before the second cryptographic key. However, with other embodiments, the second cryptographic key can perform signing before the third cryptographic key.

Figure 2:
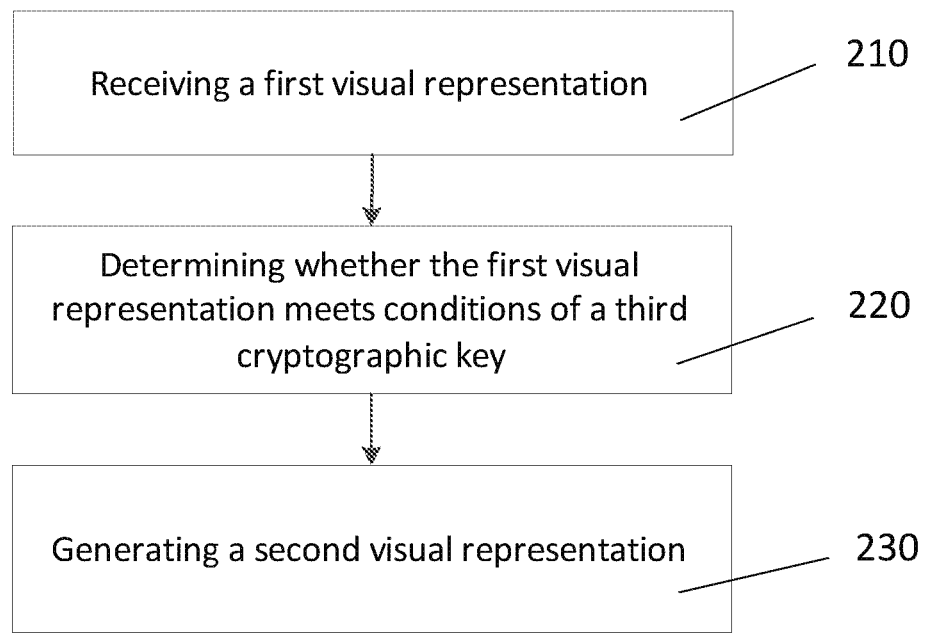
FIG. 2 illustrates a flowchart of a method in accordance with another embodiment of the invention.

FIG. 2 illustrates a flowchart of a method in accordance with certain embodiments of the invention. The method illustrated in FIG. 2 includes, at 210, receiving, by a second server, a first visual representation from a first server. The first visual representation corresponds to a request to restore access to digital assets. The digital assets are accessed via M-number of cryptographic keys. Access to at least N-out-of-M keys is necessary in order to access the digital assets at a given time. N is a number less than M. The M-number of keys include at least a first key, a second key, and a third key. One of the M keys is stored on the first server. One of the M keys is stored on the second server. The key stored on the first server corresponds to the second key. The key stored on the second server corresponds to the third key. The second server is separated from the first server. With certain embodiments, the second server is totally disconnected from any network. The method also includes, at 220, determining whether the first visual representation meets conditions of the third cryptographic key for accessing the digital assets. The third cryptographic key signs the first visual representation if the first visual representation meets the conditions of the third cryptographic key for accessing the digital assets. The method also includes, at 230, generating a second visual representation. The second visual representation is generated when the first visual representation meets the conditions of the third cryptographic key.

Figure 3:
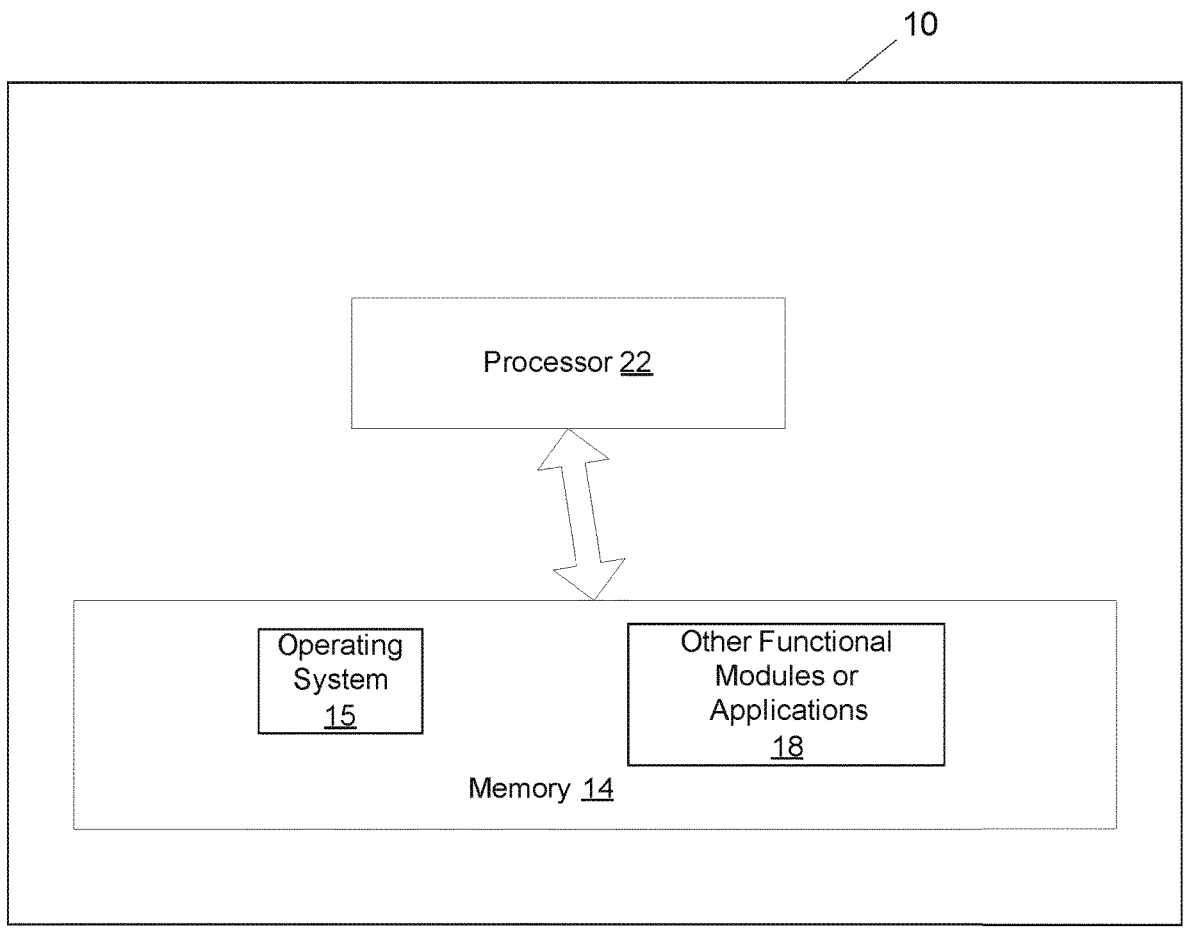
FIG. 3 illustrates an apparatus in accordance with certain embodiments of the invention.

FIG. 3 illustrates an apparatus in accordance with certain embodiments of the invention. In one embodiment, the apparatus can correspond to the company first server. In another embodiment, the apparatus can correspond to the digital wallet. Apparatus 10 can include a processor 22 for processing information and executing instructions or operations. Processor 22 can be any type of general or specific purpose processor. While a single processor 22 is shown in FIG. 3, multiple processors can be utilized according to other embodiments. Processor 22 can also include one or more of general-purpose computers, special purpose computers, microprocessors, digital signal processors (DSPs), field-programmable gate arrays (FPGAs), Hardware Security Modules (HSMs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Processor 22 can perform functions associated with the operation of apparatus 10 including, without limitation, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

With certain embodiments, apparatus 10 can be configured to receive a request to restore access to digital assets of a digital wallet. The digital assets are accessed via M-number of cryptographic keys. Access to at least N-out-of-M keys is necessary in order to access the digital assets at a given time. N is a number less than M. The M-number of keys include at least a first key, a second key, and a third key. One of the M keys is stored on apparatus 10. One of the M keys is stored on a server. The key stored on apparatus 10 corresponds to the second key. The key stored on the server corresponds to the third key. The server is separated from apparatus 10. Apparatus 10 can also be configured to generate a first visual representation of the request to restore access to digital assets. Apparatus 10 can also be configured to present the first visual representation to the server. The third cryptographic key signs the first visual representation if the first visual representation meets conditions of the third cryptographic key for accessing the digital assets. Apparatus 10 can also be configured to retrieve a second visual representation from the server. The second visual representation is generated when the first visual representation meets the conditions of the third cryptographic key. Apparatus 10 can also be configured to determine whether the second visual representation meets conditions of the second cryptographic key for accessing the digital assets. The second cryptographic key signs the second visual representation if the second visual representation meets the conditions of the second cryptographic key for accessing the digital assets. Apparatus 10 can also be configured to generate an indication that the request is cryptographically approved. The indication is generated when the second visual representation meets the conditions of the second cryptographic key. Apparatus 10 can also be configured to restore access to the digital assets of the digital wallet via the indication.

Figure 4:
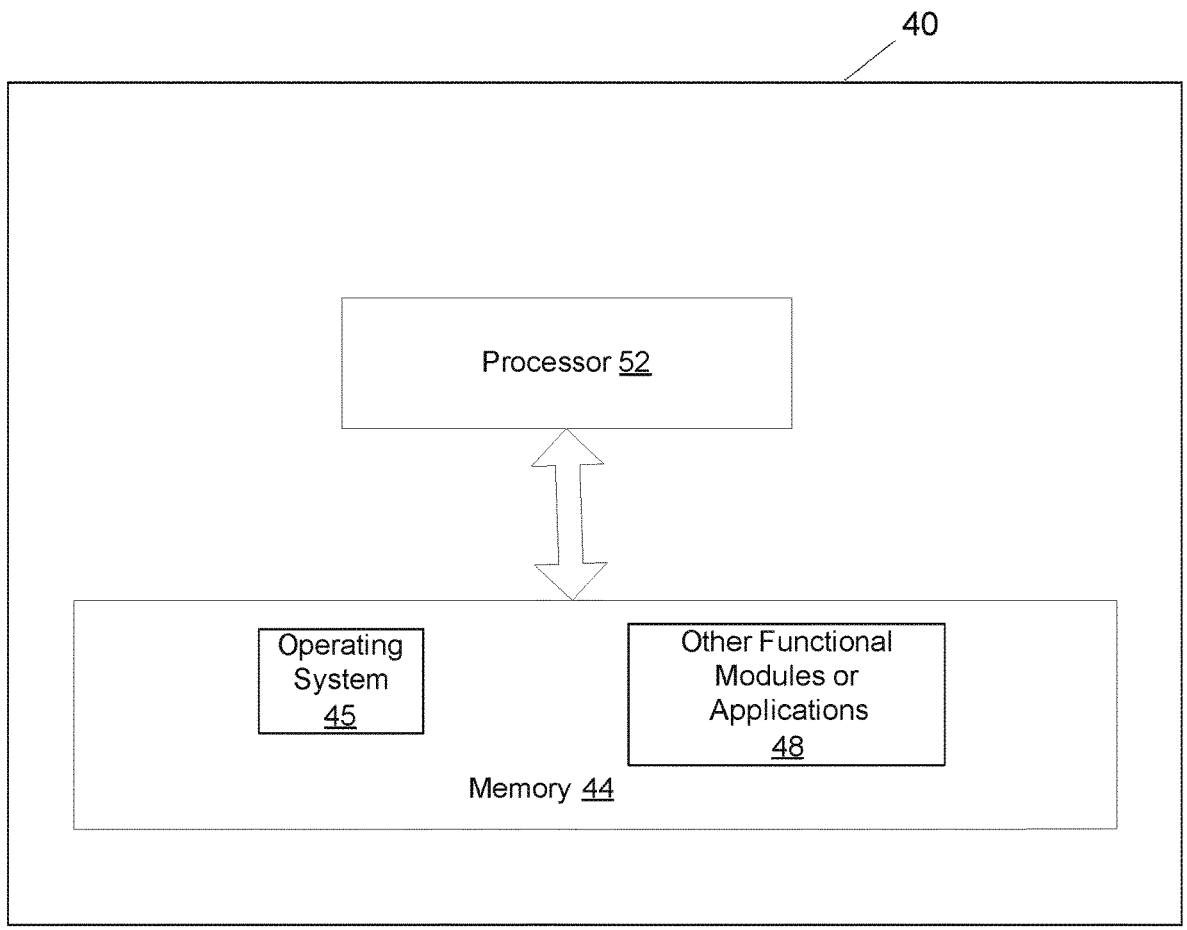
FIG. 4 illustrates an apparatus in accordance with certain embodiments of the invention.

FIG. 4 illustrates an apparatus in accordance with certain embodiments of the invention. In one embodiment, the apparatus can correspond to a second server. With certain embodiments, the second server can correspond to a backup and/or recovery server, for example Apparatus 40 can include a processor 52 for processing information and executing instructions or operations. Processor 52 can be any type of general or specific purpose processor. While a single processor 52 is shown in FIG. 4, multiple processors can be utilized according to other embodiments. Processor 52 can also include one or more of general-purpose computers, special purpose computers, microprocessors, digital signal processors (DSPs), field-programmable gate arrays (FPGAs), Hardware Security Modules (HSMs), application-specific integrated circuits (ASICs), and processors based on a multi-core processor architecture, as examples.

Apparatus 40 can further include a memory 44, coupled to processor 52, for storing information and instructions that can be executed by processor 52. Memory 44 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 44 include any combination of random access memory (RAM), read only memory (ROM), static storage such as a magnetic or optical disk, or any other type of non-transitory machine or computer readable media. The instructions stored in memory 44 can include program instructions or computer program code that, when executed by processor 52, enable the apparatus 40 to perform tasks as described herein.

In an embodiment, memory 44 can store software modules that provide functionality when executed by processor 52. The modules can include an operating system 45 that provides operating system functionality for apparatus 40. The memory can also store one or more functional modules 48, such as an application or program, to provide additional functionality for apparatus 40. The components of apparatus 40 can be implemented in hardware, or as any suitable combination of hardware and software.

With certain embodiments, apparatus 40 can be configured to receive a first visual representation from a server. The first visual representation corresponds to a request to restore access to digital assets. The digital assets are accessed via M-number of cryptographic keys. Access to at least N-out-of-M keys is necessary in order to access the digital assets at a given time. N is a number less than M. The M-number of keys include at least a first key, a second key, and a third key. One of the M keys is stored on the server. One of the M keys is stored on apparatus 40. The key stored on the server corresponds to the second key. The key stored on apparatus 40 corresponds to the third key. Apparatus 40 is separated from the server. Apparatus 40 may be totally disconnected from any network. Apparatus 40 can also be configured to determine whether the first visual representation meets conditions of the third cryptographic key for accessing the digital assets. The third cryptographic key signs the first visual representation if the first visual representation meets the conditions of the third cryptographic key for accessing the digital assets. Apparatus 40 can also be configured to generate a second visual representation, wherein the second visual representation is generated when the first visual representation meets the conditions of the third cryptographic key.

Figure 5:
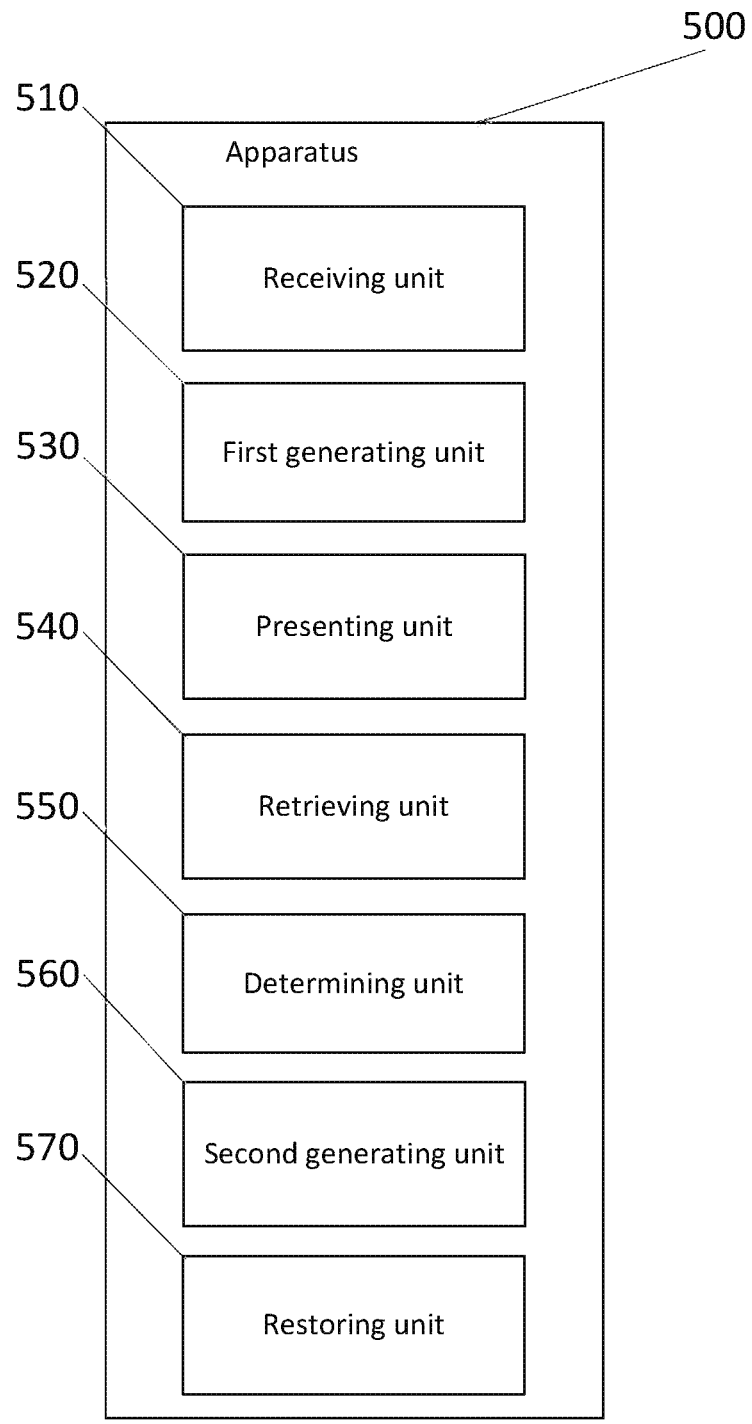
FIG. 5 illustrates an apparatus in accordance with certain embodiments of the embodiments of the invention.

FIG. 5 illustrates an apparatus in accordance with certain embodiments of the invention. Apparatus 500 can include a receiving unit 510 that receives a request to restore access to digital assets of a digital wallet. The digital assets are accessed via M-number of cryptographic keys. Access to at least N-out-of-M keys is necessary in order to access the digital assets at a given time. N is a number less than M. The M-number of keys include at least a first key, a second key, and a third key. One of the M keys is stored on apparatus 500, one of the M keys is stored on a server. The key stored on apparatus 500 corresponds to the second key. The key stored on the server corresponds to the third key. The server is separated from the apparatus 500. Apparatus 500 can also include a first generating unit 520 that generates a first visual representation of the request to restore access to digital assets. Apparatus 500 can also include a presenting unit 530 that presents the first visual representation to the server. The third cryptographic key signs the first visual representation if the first visual representation meets conditions of the third cryptographic key for accessing the digital assets. Apparatus 500 can also include a retrieving unit 540 that retrieves a second visual representation from the server. The second visual representation is generated when the first visual representation meets the conditions of the third cryptographic key. Apparatus 500 can also include a determining unit 550 that determines whether the second visual representation meets conditions of the second cryptographic key for accessing the digital assets. The second cryptographic key signs the second visual representation if the second visual representation meets the conditions of the second cryptographic key for accessing the digital assets. Apparatus 500 can also include a second generating unit 560 that generates an indication that the request is cryptographically approved. The indication is generated when the second visual representation meets the conditions of the second cryptographic key. Apparatus 500 can also include a restoring unit 570 that restores access to the digital assets of the digital wallet via the indication.

Figure 6:
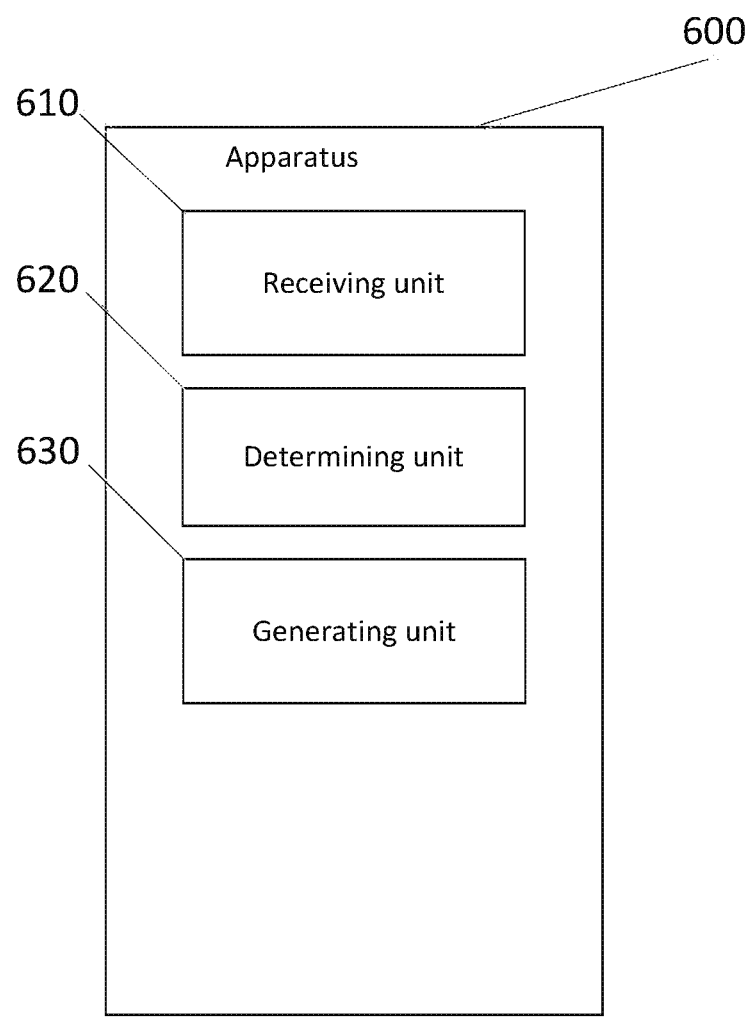
FIG. 6 illustrates an apparatus in accordance with certain embodiments of the invention.

FIG. 6 illustrates an apparatus 600 in accordance with certain embodiments of the invention. Apparatus 600 can include a receiving unit 610 that receives a first visual representation from a server. The first visual representation corresponds to a request to restore access to digital assets, the digital assets are accessed via M-number of cryptographic keys. Access to at least N-out-of-M keys is necessary in order to access the digital assets at a given time. N is a number less than M. The M-number of keys include at least a first key, a second key, and a third key. One of the M keys is stored on the server, one of the M keys is stored on apparatus 600. The key stored on the server corresponds to the second key. The key stored on apparatus 600 corresponds to the third key. Apparatus 600 is separated from the server. Apparatus 600 may be totally disconnected from any network. Apparatus 600 can also include a determining unit 620 that determines whether the first visual representation meets conditions of the third cryptographic key for accessing the digital assets. The third cryptographic key signs the first visual representation if the first visual representation meets the conditions of the third cryptographic key for accessing the digital assets. Apparatus 600 can also include a generating unit 630 that generates a second visual representation. The second visual representation is generated when the first visual representation meets the conditions of the third cryptographic key.

Figure 7:
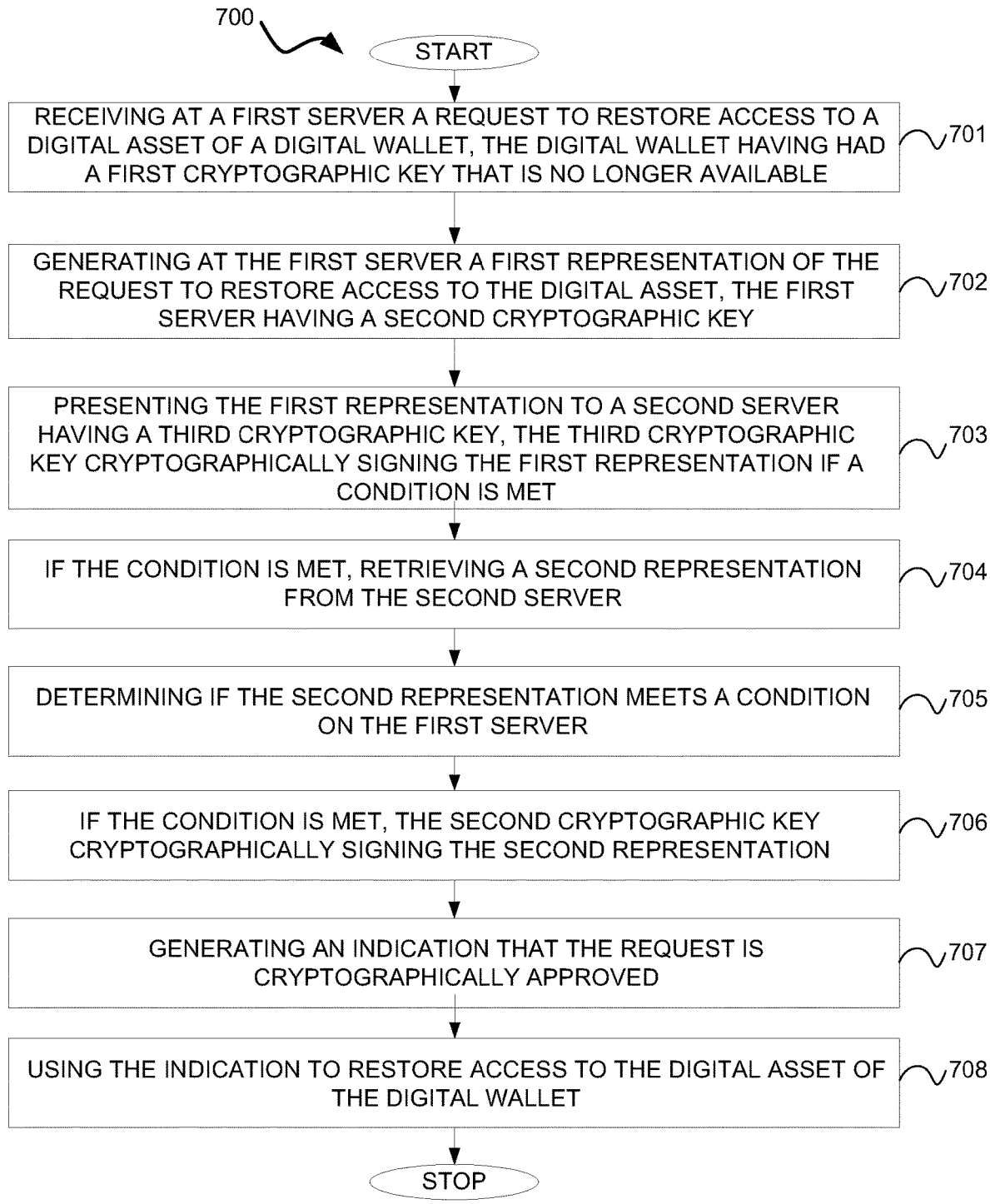
FIG. 7 shows an exemplary method for restoring access to a digital asset.

FIG. 7 shows an exemplary method 700 for restoring access to a digital asset.

At step 701, a first server receives a request to restore access to a digital asset of a digital wallet, with the digital wallet having had a first cryptographic key that is no longer available.

According to many exemplary embodiments, the digital asset is a cryptocurrency.

At step 702, the first server generates a first representation of the request to restore access to the digital asset, with the first server having a second cryptographic key. Also, the second cryptographic key may be different than the first cryptographic key.

In various exemplary embodiments, the first representation includes a first quick response code. Additionally, the first quick response code may include a representation of an unsigned digital asset.

In various exemplary embodiments, the first representation includes binary data carried on a physical memory support. Additionally, the binary data may include a representation of an unsigned digital asset.

At step 703, the first representation is presented to a second server having a third cryptographic key, with the third cryptographic key cryptographically signing the first representation if a condition is met.

According to various exemplary embodiments, the third cryptographic key may have a correspondence with the second cryptographic key. Additionally, the third cryptographic key may have a correspondence with the second cryptographic key and a first cryptographic key.

The first server, in various exemplary embodiments, is on a network that does not include the second server. Additionally, the second server may be disconnected from any network.

At step 704, if the condition is met, a second representation is retrieved from the second server.

At step 705, it is determined if the second representation meets a condition on the first server.

At step 706, if the condition is met, the second cryptographic key cryptographically signs the second representation.

At step 707, an indication is generated that the request is cryptographically approved.

At step 708, the indication is used to restore access to the digital asset of the digital wallet. The digital asset, according to some exemplary embodiments, is moved into a new digital wallet.

Figure 8:
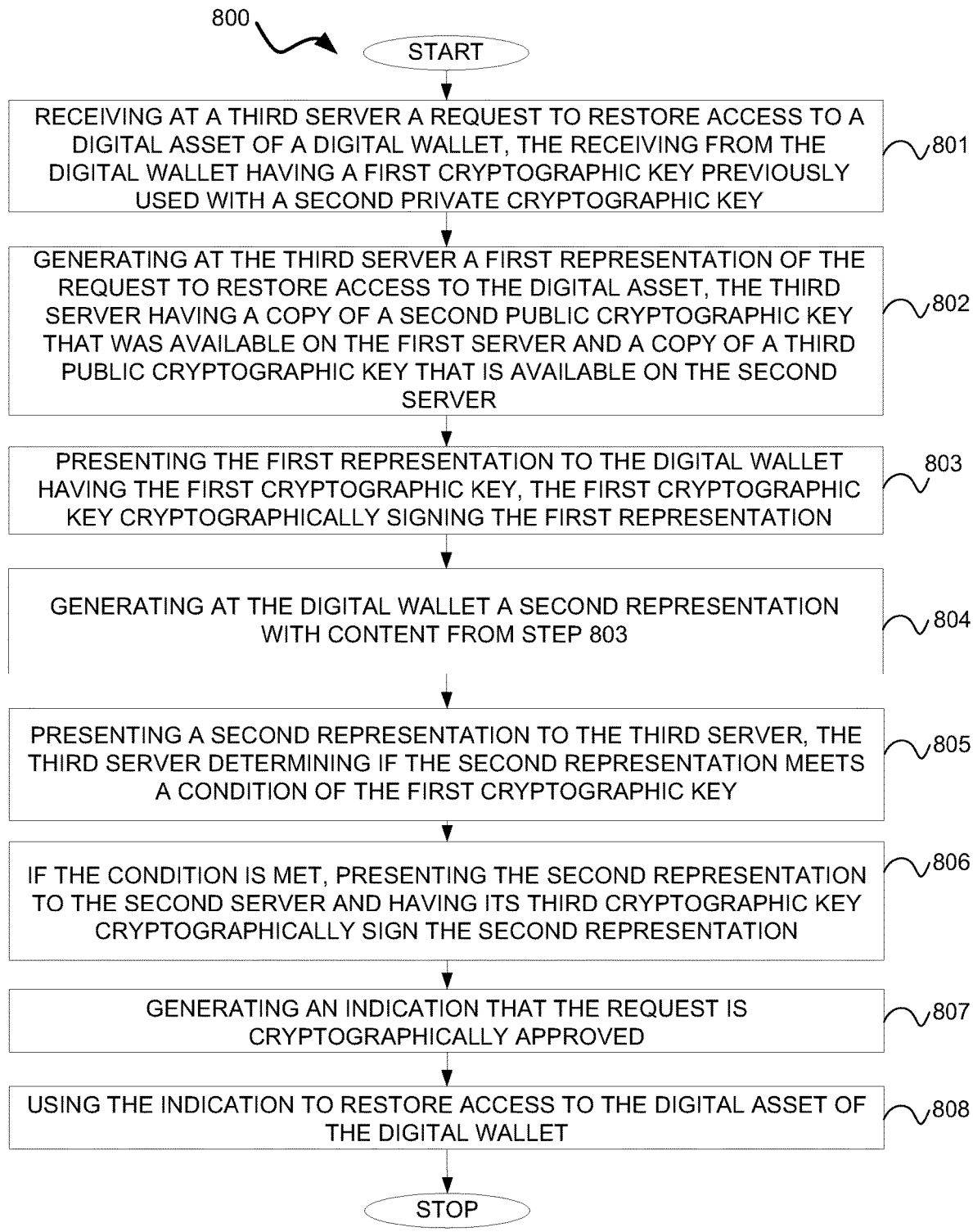
FIG. 8 shows another exemplary method for restoring access to a digital asset.

FIG. 8 shows another exemplary method 800 for restoring access to a digital asset.

At step 801, a third server receives a request to restore access to a digital asset of a digital wallet, the request coming from the digital wallet having a first cryptographic key. The first cryptographic key was previously used with a second private cryptographic key that was on a first server to access the digital asset and now the second private cryptographic key is no longer available on the first server and thus, the digital asset is no longer accessible.

At step 802, the third server generates a first representation of the request to restore access to the digital asset, with the third server having a copy of a second public cryptographic key that was available on the first server and a copy of a third public cryptographic key that is available on the second server.

At step 803, the first representation is presented to the digital wallet having the first cryptographic key, with the first cryptographic key cryptographically signing the first representation.

At step 804, the digital wallet generates a second representation with the content resulting from step 803.

At step 805, a second representation is presented to the third server, with the third server determining if the second representation meets a condition of the first cryptographic key.

At step 806, if the condition is met, the second representation is presented to the second server, and having its third cryptographic key cryptographically sign the second representation.

At step 807, an indication is generated that the request is cryptographically approved.

At step 808, the indication is used to restore access to the digital asset of the digital wallet.

Figure 9:
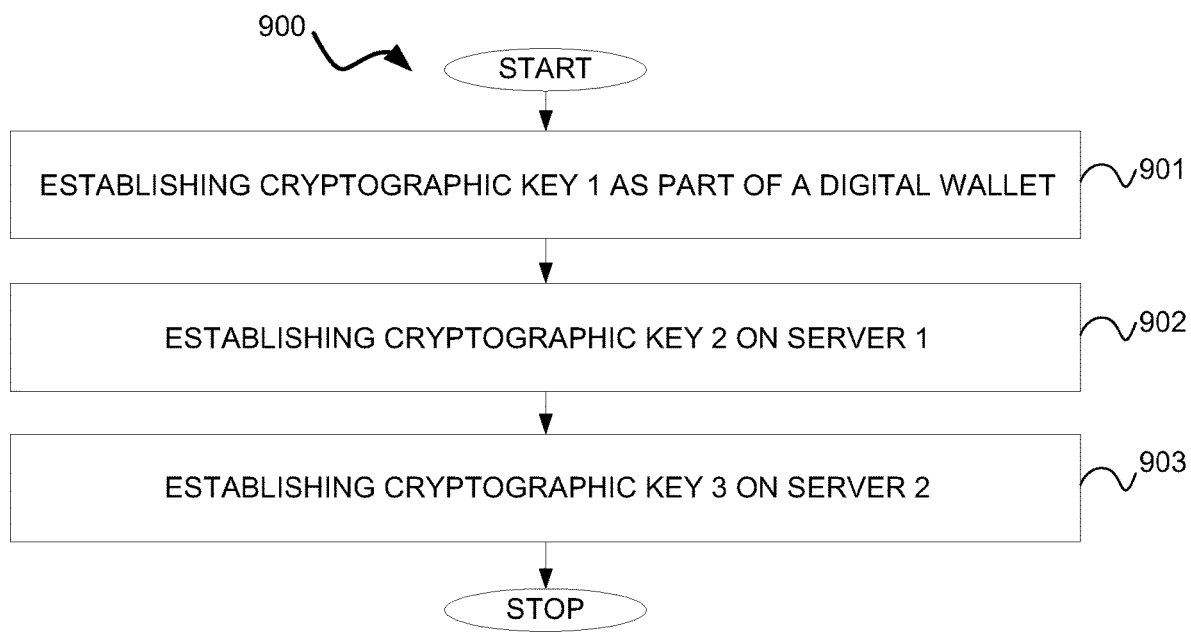
FIG. 9 shows yet another method for restoring access to a digital asset.

FIG. 9 shows yet another method 900 for restoring access to a digital asset.

At step 901, a cryptographic key 1 is established as part of a digital wallet.

At step 902, a cryptographic key 2 is established on server 1.

At step 903, a cryptographic key 3 is established on server 2. According to further exemplary embodiments, cryptographic keys 3+Y may be established on servers 2+Y, wherein Y represents integers under 1,000,000 and no more than one cryptographic key is established per server. Additionally, a number of cryptographic keys strictly less than 3+Y may be required to restore access to the digital asset. One of the servers may be isolated from any network and the digital wallet may be communicatively coupled to one or more of the networked servers.

For example, Y may equal four. Accordingly:

A cryptographic key 1 is established as part of a digital wallet.
A cryptographic key 2 is established on server 1.
A cryptographic key 3 is established on server 2.
A cryptographic key 4 is established on server 3.
A cryptographic key 5 is established on server 4.
A cryptographic key 6 is established on server 5.
A cryptographic key 7 is established on server 6.

With a total of 3+4=7 cryptographic keys, 6 cryptographic keys are required to restore access to the digital asset. Additionally, any one of servers 1 through 6 is isolated from any network.

According to an alternative embodiment, cryptographic keys 3+Y may be established on servers 2+X, wherein Y and X represent integers under 1,000,000, X is less than Y, and more than one cryptographic key is established on at least one server.

For example, Y may equal four and X may equal three. Accordingly:

A cryptographic key 1 is established as part of a digital wallet.
A cryptographic key 2 is established on server 1.
A cryptographic key 3 is established on server 2.
A cryptographic key 4 is established on server 3.
A cryptographic key 5 is established on server 4.
Cryptographic keys 6 and 7 are established on server 5.

With a total of 3+4=7 cryptographic keys, 6 cryptographic keys are required to restore access to the digital asset. Additionally, any one of servers 1 through 5 is isolated from any network.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A method for restoring access to a digital asset, the method comprising:
    receiving at a first server a request to restore access to a digital asset of a digital wallet, the digital wallet having had a first cryptographic key that is no longer available;
    generating at the first server a first representation of the request to restore access to the digital asset, the first server having a second cryptographic key;
    presenting the first representation to a second server having a third cryptographic key, the third cryptographic key cryptographically signing the first representation if a condition is met;
    if the condition is met, retrieving a second representation from the second server;
    determining if the second representation meets a condition on the first server;
    if the condition is met, the second cryptographic key cryptographically signing the second representation;
    generating an indication that the request is cryptographically approved; and
    using the indication to restore access to the digital asset of the digital wallet.

2. The method of claim 1, wherein the digital asset is a cryptocurrency.

3. The method of claim 1, further comprising separating the first server on a network that does not include the second server.

4. The method of claim 3, further comprising disconnecting the second server from any network.

5. The method of claim 1, further comprising the first representation including a first quick response code.

6. The method of claim 5, further comprising the first quick response code including a representation of an unsigned digital asset.

7. The method of claim 1, further comprising the first representation including binary data carried on a physical memory support.

8. The method of claim 7, further comprising the binary data carried on the physical memory support including a representation of an unsigned digital asset.

9. The method of claim 1, further comprising a correspondence of the third cryptographic key with the second cryptographic key.

10. The method of claim 1, further comprising moving the digital asset into a new digital wallet.

11. The method of claim 1, further comprising making the second cryptographic key a different key than the first cryptographic key.

12. The method of claim 1, further comprising a correspondence of the third cryptographic key with the second cryptographic key and the first cryptographic key.

13. A method for restoring access to a digital asset, the method comprising:
    receiving at a third server a request to restore access to a digital asset of a digital wallet, the receiving from the digital wallet having a first cryptographic key, the first cryptographic key previously used with a second private cryptographic key that was on a first server to access the digital asset and now the second private cryptographic key is no longer available on the first server and the digital asset is no longer accessible;

generating at the third server a first representation of the request to restore access to the digital asset, the third server having a copy of a second public cryptographic key that was available on the first server and a copy of a third public cryptographic key that is available on the second server;

presenting the first representation to the digital wallet having the first cryptographic key, the first cryptographic key cryptographically signing the first representation;

generating at the digital wallet a second representation with the content resulting from the step above;

presenting a second representation to the third server, the third server determining if the second representation meets a condition of the first cryptographic key;

if the condition is met, presenting the second representation to the second server, and having its third public cryptographic key cryptographically sign the second representation;

generating an indication that the request is cryptographically approved; and using the indication to restore access to the digital asset of the digital wallet.

14. The method of claim 13, wherein the digital asset is a cryptocurrency.

15. The method of claim 13, wherein the first representation comprises a first quick response code.

16. The method of claim 13, wherein the first representation comprises binary data carried on a physical memory support.

17. The method of claim 13, further comprising moving the digital asset into a new digital wallet.

* * * * *